US006864811B2

(12) United States Patent
Shadan

(10) Patent No.: US 6,864,811 B2
(45) Date of Patent: Mar. 8, 2005

(54) METHOD AND SYSTEM FOR EMBEDDING DATE INFORMATION IN COMPUTER-GENERATED DIGITS

(76) Inventor: Kamyar Shadan, 7 Carmel Dr., Novato, CA (US) 94945

(\*) Notice: Subject to any disclaimer, the term of this patent is extended or adjusted under 35 U.S.C. 154(b) by 40 days.

(21) Appl. No.: 10/665,677

(22) Filed: Sep. 19, 2003

(65) Prior Publication Data

US 2004/0113821 A1 Jun. 17, 2004

Related U.S. Application Data

(60) Provisional application No. 60/412,195, filed on Sep. 19, 2002.

(51) Int. Cl.[7] .............................................. H03M 7/00
(52) U.S. Cl. ......................................... 341/50; 382/251
(58) Field of Search ..................... 341/50, 51; 382/100, 382/251, 250; 370/394; 380/28; 348/3.28, 465; 713/176

(56) References Cited

U.S. PATENT DOCUMENTS

| | | | | |
|---|---|---|---|---|
| 4,748,620 A | \* | 5/1988 | Adelmann et al. | 370/394 |
| 5,727,092 A | \* | 3/1998 | Sandford et al. | 382/251 |
| 5,822,432 A | \* | 10/1998 | Moskowitz et al. | 380/28 |
| 6,111,990 A | \* | 8/2000 | Sugaya et al. | 382/250 |
| 6,262,775 B1 | \* | 7/2001 | Kim | 348/465 |
| 6,268,866 B1 | \* | 7/2001 | Shibata | 358/3.28 |
| 6,282,650 B1 | \* | 8/2001 | Davis | 713/176 |
| 6,389,152 B2 | \* | 5/2002 | Nakamura et al. | 382/100 |
| 6,415,041 B1 | \* | 7/2002 | Oami et al. | 382/100 |
| 6,418,232 B1 | \* | 7/2002 | Nakano et al. | 382/100 |

\* cited by examiner

*Primary Examiner*—Jean Bruner Jeanglaude

(57) ABSTRACT

A method and system for creating a permanent and authentic history of a computer generated numerical digit enables one to track digit's life path. The method comprises embedding each digit with a tamper detectable date-time stamp including at least the date when the digit is generated in the computer. The system includes an encoder for providing the numerical digit with the date stamp, a storage for storing the encoded numerical digit, and a decoder for decoding the numerical digit to indicate at least the date of origin of the numerical digit.

20 Claims, 2 Drawing Sheets

US 6,864,811 B2

METHOD AND SYSTEM FOR EMBEDDING DATE INFORMATION IN COMPUTER-GENERATED DIGITS

REFERENCE TO PRIOR APPLICATION

This application for patent claims, under 35 U.S.C. § 119(e), the benefit of the filing date of U.S. Provisional Application for Pat. Ser. No. 60/412,195, titled "METHOD AND SYSTEM FOR EMBEDDING DATE INFORMATION IN COMPUTER-GENERATED DIGITS" and filed on Sep. 19, 2002.

FIELD OF THE INVENTION

The present invention relates generally to a method and system for embedding a digital stamp into numerical digits generated by a computer and more specifically for embedding data concerning the origin of the digits.

BACKGROUND OF THE INVENTION

Traditionally, digits have been used to identify specified quantities. They have been used to represent capital expenditures, revenues, phone numbers, social security numbers, distance, weight, age, etc. Standing alone, digits have no distinguishing character and are considered random, assignable and auxiliary tools. There is a need for digits like words to have inherent meaning and individuality.

Assigned digits are manmade and identify critical information in various contexts. There are numerous prior art methods for using digits in other areas such as encryption and programming. This random use of digits is an anonymous device to identify something else. The digits themselves have no inherent meaning or definition. There is a need for digits to become the subject of data with an inherent genome and history.

Using digital signatures for validating data is well known. However, such signatures are not valid indefinitely, but only during the validity periods of their authentication certificates. This presents a problem for numerical digits, which reside in financial documents, spreadsheets, reports, etc., and are stored on hard drives of computers, floppy discs, and other data storage means. At the present time, there is no method for creating a permanent and authenticable history in order to track the life path of a computerized numeric digit from its time of generation to deletion.

The history of a digit has never been more important to the success of the capital markets and the progression of the free world, free markets and the world economy. Under prior art accounting systems, digits have been randomly altered, changed, extracted, reported and transcribed. These prior art methods, however, invite error and fraud due to the level of discretion involved. One only has to look at the numerous reports of questionable accounting practices during the early period of the $21^{st}$ Century to recognize that there is a considerable need to track the life history of numerical data. The importance of legitimate and accurate financial data has never been at a higher state of public awareness than it is today.

Numerous prior art solutions have been developed to ensure the integrity and non-repudiation of digital information, e.g., digital/electronic signatures, watermarks, and stamps. Each of these technologies has very similar functions, but is unique in its particular application. Digital/electronic signatures, a byproduct of Public Key Infrastructure, are used typically in signing documents, document clusters, and E-mail. Digital/electronic watermarks are used for verification and copyright protection. Digital/electronic stamps can use a combination of digital signatures and content preserving techniques to provide verification of photographic images.

There are numerous prior art systems for inserting a digital watermark in images, digital files, and video data; see, for example, U.S. Pat. Nos. 5,822,432, 6,111,990, 6,262,775, 6,268,866, 6,282,650, 6,389,152, 6,415,041, and 6,418,232. Basically, all prior art systems operate around the same concept. For example, digital watermarks alter a digital image to provide digital information supplied by the party who embeds the watermark. The embedded watermarks can be viewed with stand alone or plug in software to reveal either a unique identification code traceable to the copyright owner or copyright ownership information. These basic digital watermark systems can be broadly classified into two types. In one type, sampled digital values of waveform and pixels are processed, and the watermark is embedded therein. In another type, the digital data is divided into a plurality of small pixel blocks, and watermark information is embedded into the pixel blocks. This method is often referred to as the block division method. In this type, image data is divided into a plurality of small unit pixel blocks. Each of these small blocks has a size of N×N pixels. A watermark is added to the pixel block having the same block size of this unit pixel block. In this type, the watermark is undisturbed even if a portion of image data of one frame is extracted because its size is not smaller than that of the unit pixel block.

U.S. Pat. No. 5,727,092 discloses a method of embedding auxiliary information into the digital representation of host data created by a lossy compression technique.

None of these prior art technologies have been used to provide content/identity verification specific to electronically generated numeric digits. There is a need for a method and a system to establish a permanent and authentic history of a newly created numerical digit to enable one to track its life path from birth to retirement.

SUMMARY OF A PREFERRED EMBODIMENT OF THE INVENTION

In one embodiment of the present invention, a method and system are provided for stored electronic numerical digits that have been created by an individual, corporation or a computer program having a trusted embedded or attached digital stamp to verify the date of creation, the creator, its history, duplication incidents, forwarding incidents, change incidents, e.g., increases/decreases and delta, outside reporting incidents for that particular individual or set of digits/numbers and/or submitted digits, etc.

Numerical digits include those used to represent capital expenditures, phone numbers, social security numbers, weight, height, age, etc., and other forms of measurement that are computer generated. Computer generated numerical digits include the digits that are entered directly into a computer and that are generated after the entry of the digit into the computer, e.g., digits generated by a spreadsheet. The digits can be data regarding revenue, debt, capital expenditure, operational expenditure, etc.

A method in accordance with an embodiment of the present invention comprises embedding or otherwise attaching to each computer generated digit a digital stamp containing at least the creation date of the digit. The method in accordance with the present invention is designed to embed or attach a tracking history to the digit that is a tamper detectable date-time electronic stamp and that is not intended to be altered.

Each of the created digits within a database in accordance with the present invention has its own unique identifier either within the body of the digit itself or attached in an encrypted file unique only to that digit. This genome and genetic profile will enable one to track every alteration, change, duplication, and location of that digit until it is retired or otherwise deleted. A digit can grow or shrink and even go into a negative state. Each individual or series of numbers and/or digits has at least a creation date, and preferably, a history log and a termination/archive date when applicable.

The digit embedded with such a date stamp or time stamp are referred to as smart numbers, smart digits, intelligent numbers, intelligent digits, digital intelligence, genetic numbers, genetic digits, digital genome, digital genetics, and smart financial reports, etc. The present method is designed for hiding information inside the digits to produce embedded data, which may be referred to as coded digits, numbers with memory, profiled digits, unique numbers, encoded digital, unique numbers, unique digits, smart financials, digit track, live numbers, and live digits, Diginome, etc.

In a system in accordance with one embodiment of the present invention, a means is provided for attaching an encoded historical record to a numerical digit; a storage means is used for storing the encoded numerical digit; and a decoder means is available for decoding the numerical digit to indicate at least the date of its generation.

DETAILED DESCRIPTION OF VARIOUS EMBODIMENTS

Further features and advantages of the present invention will become apparent from the following and more particular description of various embodiments of the present invention, as illustrated in the accompanying drawings.

Figure 1:
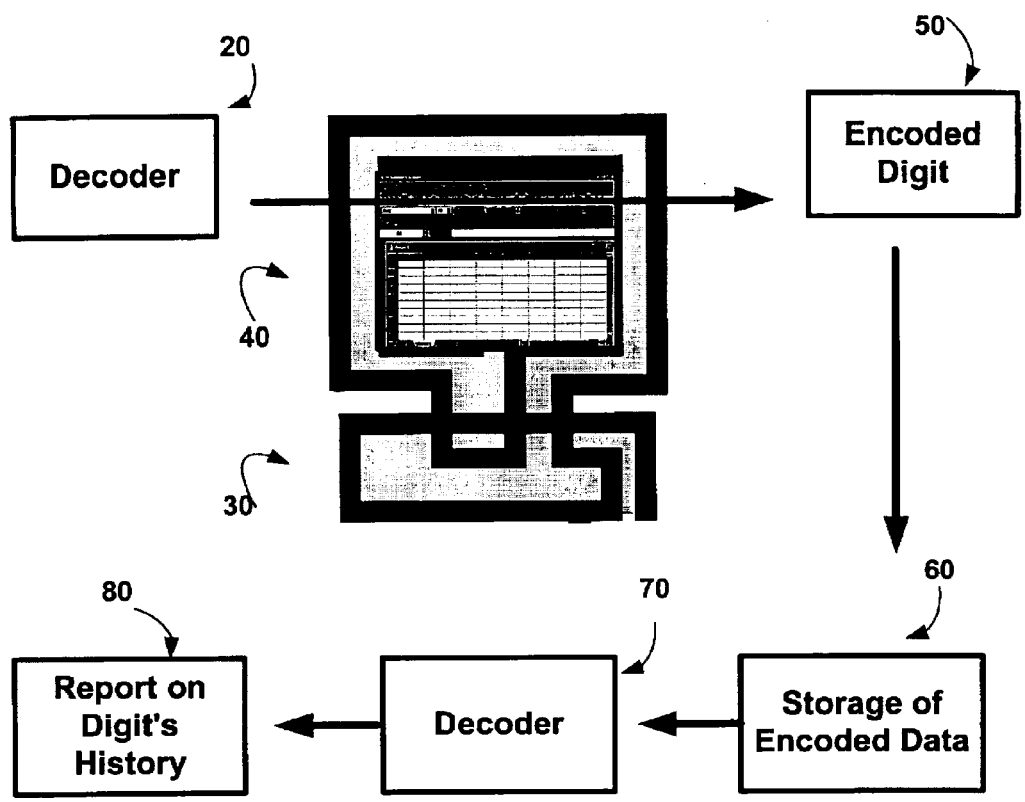
FIG. 1 is a block diagram illustrating a system for data encoding in accordance with the present invention.

FIG. 1 is a block diagram illustrating a data encoding system 10 in accordance with an embodiment of the invention. System 10 comprises an encoder 20 for embedding date information into a digit, e.g., digit "1", entered via a computer 30 in the first cell of a spreadsheet displayed in a monitor 40. By way of example, computer 30 may be a mainframe computer, a personal computer, a desktop computer, a notebook computer, a mobile computer, a laptop computer, a pocket computer, a workstation computer, and so forth.

A software program in conjunction with an internal real time clock (not shown) of computer 30 sends the generation date of the digit "1" to encoder 20. In accordance with one embodiment of the present invention, the software program is based on a much less complicated program version than data fingerprinting programs that are well known to those of ordinary skill in the art and that are not used in conjunction with a real time clock.

Encoder 20 encrypts and preferably compresses the date information and embeds it or otherwise attaches the date information to that digit and all subsequent digits entered or generated by the software program to form an encoded digit 50 or a data file. Encoded digit 50 or entire data file is then sent to a storage unit 60. In accordance with a preferred embodiment, storage unit 60 is a hard disk drive. However, this is not intended as a limitation on the scope of the present invention. Additional storage mediums suitable for storage unit 60 include Compact Disk-Read Only Memory (CD-ROM), magnetic tape, Magneto Optical Disk (MO), Digital Video Disk-Read Only Memory (DVD-ROM), Digital Video Disk-Random Access Memory (DVD-RAM), floppy disk, memory chips such as Random Access Memory (RAM) chips and Read Only Memory (ROM) chips, Erasable Programmable Read Only Memory (EPROM), and Electrically Erasable Programmable Read Only Memory (EEPROM).

In various embodiments of the present invention, additional information can be embedded into each digit, including a date code representing the date the digit is changed or otherwise altered, and the date the digit is sent to the archives or the entire file is deleted from the record media.

The stored data from storage unit 60 may be sent to a decoder 70 to reverse the encryption of the data information and history of each digit in the data file. The decrypted information is stored in the form of a history 80. The keys to decode the digit or the entire file resides in only those trusted persons in an organization, corporation, database company, government entity and/or any other groups of individuals who rely on the digits in databases, reports and other documents, to have a source of authentication along with standard identifiers used in test, spreadsheets or databases.

Figure 2:
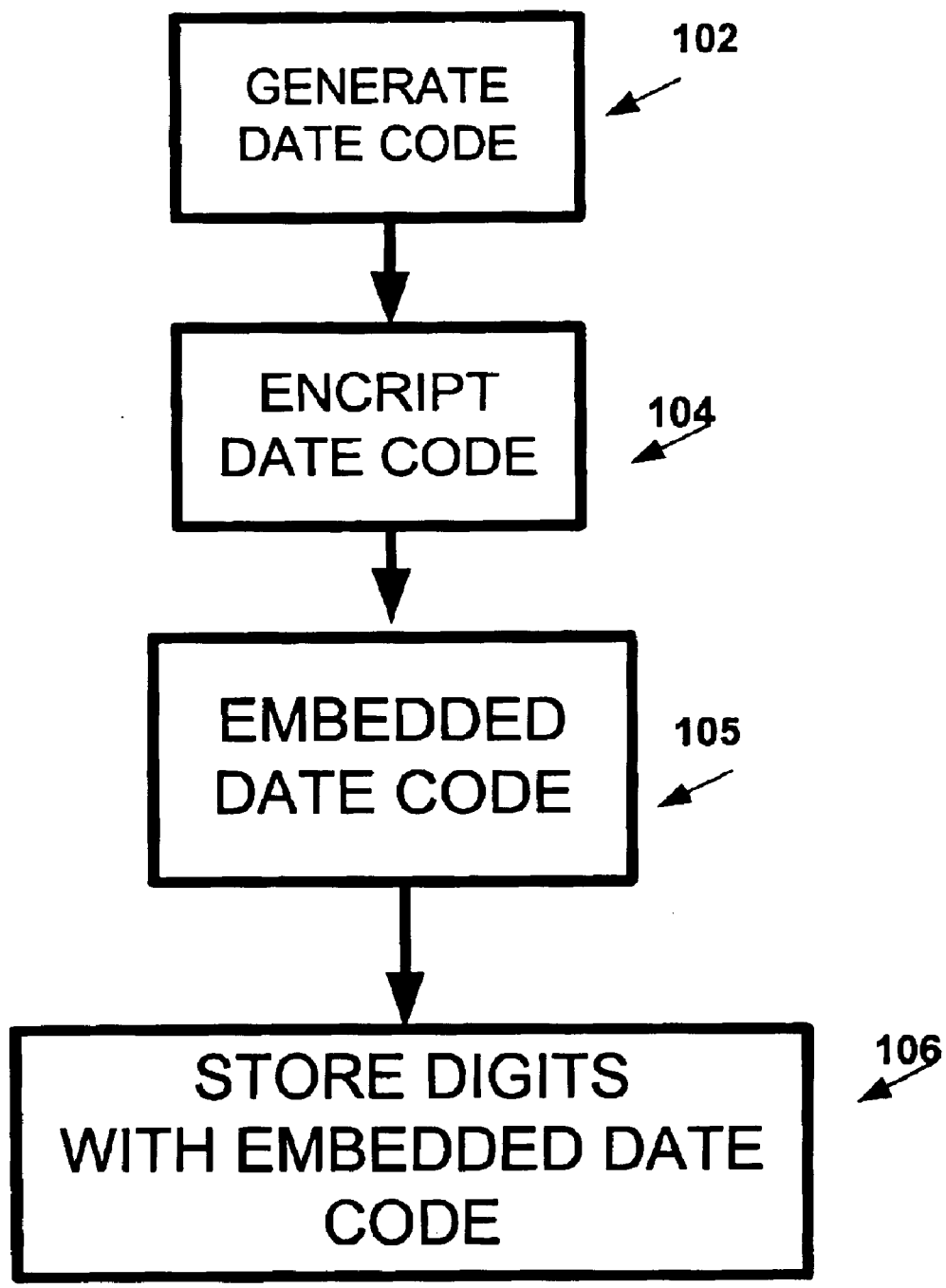
FIG. 2 is a block diagram illustrating a data encoding process in accordance with the present invention.

FIG. 2 illustrates a process 100 for embedding data in computer generated digits in accordance with the present invention. By way of example, data embedding process 100 can be performed using system 10 shown in FIG. 1. In a step 102, a date code for each computer generated digit is established based on a computer's real time clock. In a step 104, the date code is encrypted. In accordance with a specific embodiment, step 104 of encrypting the date code also compresses the date code. It should be noted that compressing the date code is optional in accordance with the present invention. A digital block representing this encrypted date code or time code is embedded or otherwise attached to the digital blocks representing each digit, e.g., the digit's bit plane, in a step 105, thereby forming a date stamp or time stamps of the digit. Subsequently in a step 106, the data files containing the plurality of digits with their corresponding embedded date codes are sent to a storage element, e.g., a record medium. The date codes form hidden attributes of the digits making up a data file and will not appear on either a display monitor or a subsequent offset printing of a document representing a spreadsheet or other data file.

The digital stamp in accordance with the present invention includes a scrambled code representing, for example, the digit's date of generation or origin, and history. This feature is not present in digital watermarks that include a number of fields selected from information on a copyrightable work, such as musical recordings, movies, and video games. The digital stamps in accordance with a specific embodiment of the present invention are encoded by conventional encoding means, like those in the digital watermarks. Random or pseudo random keys can serve as the means for locating and decoding the date code information. These secret keys are programmed to be impossible for a party without the key to find the digital stamp and, more importantly, attempt to tamper or otherwise alter the stamp. Secret keys or single key algorithms are all included under the field of key cryptography such as Data Encryption Standard (DES), preferably using Triple-DES algorithm and an Open-Pretty Good Privacy (PGP) format that are well known to those skilled in the art.

The data embedding method and system in accordance with the present invention has a wide range of applications. The following scenarios represent non-exclusive examples of the applications.

Scenario 1 (Birth of a Bank Account):

An account is opened and given an account number based on the business rules of the institution. When the account is created, the initial deposit gives rise to the birth of a unique number with features and characteristics distinct from any other number. That number, which may be "0", is given a birth time and date along with characteristic information such as the form and source of currency. The information is embedded within the number and encrypted. From that point on the newly born number will have its heritage and ancestry embedded in it until it is moved, transformed, or terminated. Every subsequent transaction, addition or deduction will be recorded in this manner so that the history of any given number within the account, e.g., balance, deposit, withdrawal, etc., will always be available. Upon closing the account, the account number will be archived with a balance, e.g., "0", and that "0" will contain a historical genome reflecting the events, times, locations and heritage of its existence. As funds flow out of the individual account, the unique digit will become part of another digit heritage and will be able to unravel history, which will go back to that particular digit history along with its heritage.

Scenario 2 (Revenue Numbers):

Revenue numbers are often proceeded by additional information, e.g., projected numbers. Once a projection is entered into a financial spreadsheet or any electronic form, it will be given an embedded and encrypted birth record. Any alterations to that digit will be recorded so that the record will contain complete and detailed historical information. Once the actual numbers come in, the history of the digit will show replacement of the projection with actual numbers and that process will continue and provide a detailed profile of with whom that number was shared, who altered it and who attempted to alter it. Any alteration of the digit will require one, two, three, or other specified approvals based on the organizations business rules or the standards to be placed on such intricate and important information.

Scenario 3 (Social Security Number):

The present invention can be applied to Social Security numbers. Once a person is born and given a social security number, an encrypted history file can be embedded that will reflect all major and detectable events in that persons life from beginning to end.

Scenario 4 (Debt):

A person's debt can be tracked from origin to payoff or default. This will help prevent the kiting of bank loans and credit cards along with corporate debt taken on by companies such as leases, and sales lease backs. This number will have a birth date with a complete history of its origin, life and retirement. For corporations, the history will reflect who, when, why and how the liability was created along with the contractual relationship backing it.

Scenario 5 (Assets):

Assets tracking is critical in our current mode of crisis especially due to very sophisticated money laundering schemes and terrorist initiatives worldwide. The present invention can be used to track assets from birth through all transfers and manipulations that take place within it. A dollar earned by a smuggler or a terrorist is unique and has a unique history that needs to be traceable. So when funds are deposited into an overseas account, according to the present invention, they will have an encrypted, embedded historical record that cannot be erased without a decryption key.

By now it should be appreciated that a method and system for creating a permanent and authentic history of a computer generated numerical digit have been provided. The method and system enable one to track digit's life path. In accordance with the present invention, the method comprises embedding each digit with a tamper detectable date-time stamp including at least the date when the digit is generated in the computer. The system includes an encoder for providing the numerical digit with the date stamp, a storage for storing the encoded numerical digit, and a decoder for decoding the numerical digit to indicate at least the date of origin of the numerical digit.

Without departing from the spirit and scope of this invention, one of ordinary skill in the art can make various changes and modifications to the invention to adapt it to various usages and conditions. For example, the method and system in accordance with the present invention has been illustrated using representative hardware. However, the invention is equally adaptive to the use of hardware that is likely to have widespread use in the future. As such, these changes and similar modifications are properly, equitably, and intended to be, within the full range of equivalents of the following claims.

What is claimed is:

1. A system for creating a history of a computer generated numerical digit, comprising:
    a code generator, said code generator generating a time stamp representing a time when the numerical digit is generated;
    an encoder coupled to said code generator, said encoder encoding the numerical digit with the time stamp to generate an encoded digit; and
    a storage coupled to said encoder, said storage storing the encoded digit.

2. The system of claim 1, further comprising a decoder coupled to said storage, said decoder decoding the encoded digit to reveal the history of the numerical digit.

3. The system of claim 1, wherein said code generator is further configured to generate a second time stamp including a time when the numerical digit is changed.

4. The system of claim 1, wherein said code generator is further configured to generate a second time stamp including a time when the numerical digit is terminated from the storage.

5. The system of claim 1, wherein said code generator is programmed to generate the time stamp being tamper detectable.

6. A computer readable medium having an executable program stored thereon, the program comprising the steps of:
    in response to a computer generating a digit, generating a first code indicating a time of the computer generating the digit in accordance with a real time clock in the computer;
    encoding the digit by embedding the first code in the digit; and
    storing the digit in a storage.

7. The computer readable medium of claim 6, the program further comprising the steps of:
    in response to the computer changing the digit, embedding a second code in the digit indicating a time of the computer changing the digit; and
    in response to the computer terminating the digit from the storage, embedding a third code in the digit indicating a time of the computer terminating the digit from the storage.

8. The computer readable medium of claim 6, the program further comprising the step of decoding the digit to establish a history of the digit.

9. The computer readable medium of claim 6, wherein the step of encoding the digit in the program includes embedding the first code in a bit plane of the digit.

10. The computer readable medium of claim 6, wherein the step of encoding the digit in the program includes making the digit tamper detectable.

11. A method for creating a history of a computer generated numerical digit, comprising:
   generating a date stamp in response to the computer generated numerical digit;
   generating an encoded digit by embedding the computer generated numerical digit with the date stamp; and
   storing the encoded digit in a record medium.

12. The method of claim 11, wherein generating a date stamp includes generating the date stamp representing date information of the computer generated numerical digit.

13. The method of claim 12, wherein generating the date stamp further includes generating the date stamp indicating a date of origin of the computer generated numerical digit.

14. The method of claim 12, wherein generating the date stamp further includes generating the date stamp indicating a date of a change of the computer generated numerical digit.

15. The method of claim 12, wherein generating the date stamp further includes generating the date stamp indicating a date of the computer generated numerical digit being terminated from record medium.

16. The method of claim 11, further comprising decoding the encoded digit to establish a history of the computer generated numerical digit.

17. The method of claim 11, wherein generating an encoded digit includes making the encoded digit tamper detectable.

18. The method of claim 11, wherein generating a date stamp includes generating the date stamp in accordance with a real time clock in a computer.

19. The method of claim 11, wherein generating an encoded digit further includes by embedding the date stamp in a bit plane of the computer generated numerical digit.

20. The method of claim 11, further comprising decoding the encoded digit to retrieve the date stamp.

* * * * *